United States Patent

[11] 3,597,967

| [72] | Inventors | Jan Drexler; Jan Havel, both of Prague, Czechoslovakia |
|---|---|---|
| [21] | Appl. No. | 802,276 |
| [22] | Filed | Feb. 25, 1969 |
| [45] | Patented | Aug. 10, 1971 |
| [73] | Assignee | Ceskoslovenska akademie ved Prague, Czechoslovakia |
| [32] | Priority | Feb. 26, 1968 |
| [33] |  | Czechoslovakia |
| [31] |  | 1473 |

[54] APPARATUS FOR APPLYING RANDOM MECHANICAL LOADS TO A TEST SPECIMEN
6 Claims, 6 Drawing Figs.

| [52] | U.S. Cl. | 73/91 |
|---|---|---|
| [51] | Int. Cl. | G01n 3/36 |
| [50] | Field of Search | 73/91, 92, 90 |

[56] References Cited
UNITED STATES PATENTS
3,214,969  11/1965  Swanson............... 73/91

*Primary Examiner*—Jerry W. Myracle
*Attorney*—Arthur O. Klein

ABSTRACT: An improved flexible fatigue testing apparatus for stressing a specimen yields a probability density of stress load amplitudes that is controlled in accordance with a random binomial pulse sequence having a variable probability of pulse occurrence and/or a variable pulse repetition rate. Analog control voltages uniquely corresponding to the pulse patterns occurring during successive test intervals operates a hydraulically driven ram coupled to the specimen. The ram imparts to the specimen a load having an amplitude determined by the then-occurring control signal.

APPARATUS FOR APPLYING RANDOM MECHANICAL LOADS TO A TEST SPECIMEN

BACKGROUND OF THE INVENTION

It is desirable in many instances to simulate the random distributions of stress loading to which an aircraft member or other structural part may be subjected in practice so that its fatigue characteristics and similar parameters under operating conditions may be examined. Apparatus employed in such testing often applies, to the specimen, a random pattern of load amplitudes that follow either a Gaussian or a uniform probability distribution. Unfortunately, the flexibility of such applied stress distributions is relatively small; in particular, the use of a Gaussian distribution generally requires the addition of separate filters to shape the random output signal, while alterations of stress patterns following a normal distribution have generally been restricted to relatively minor perturbations in the effective spectral density around the mean value. For other types of distributions, long and complicated perforated program tapes are ordinarily required to directly control the application of loads to the test specimen, and the use of such perforated tapes frequently imparts an undesirable periodicity into the ideally random distribution of applied stress.

SUMMARY OF THE INVENTION

Apparatus for applying selectable random distributions of load amplitudes to a test specimen in a simpler and more flexible manner is provided by the present invention. The probability density of the stress distribution is determined by a random sequence of electrical pulses that occupy one time slot each and that define pulse patterns having a probability density in the form of a binomial distribution over a given sequence of time slots. The probability of occurrence of a pulse in any one time slot, or the length of a single time slot, may be externally selectable to vary the overall probability density of a sequence of pulses. The pulse patterns occurring during successive sequences of the time slots are employed to produce corresponding control signals representative of the load amplitudes to be applied successively to the specimen. A suitable electromechanical converter, which may be a servo-controlled hydraulic ram, is coupled to the specimen for applying thereto a stress load having an amplitude determined by the then-occurring control signal.

Means may be additionally provided for comparing the resulting load strain distribution of the test specimen with a desired stress distribution programmed into the apparatus for altering the probability density of the binomial pulse sequence when the actual and desired distributions are significantly different.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
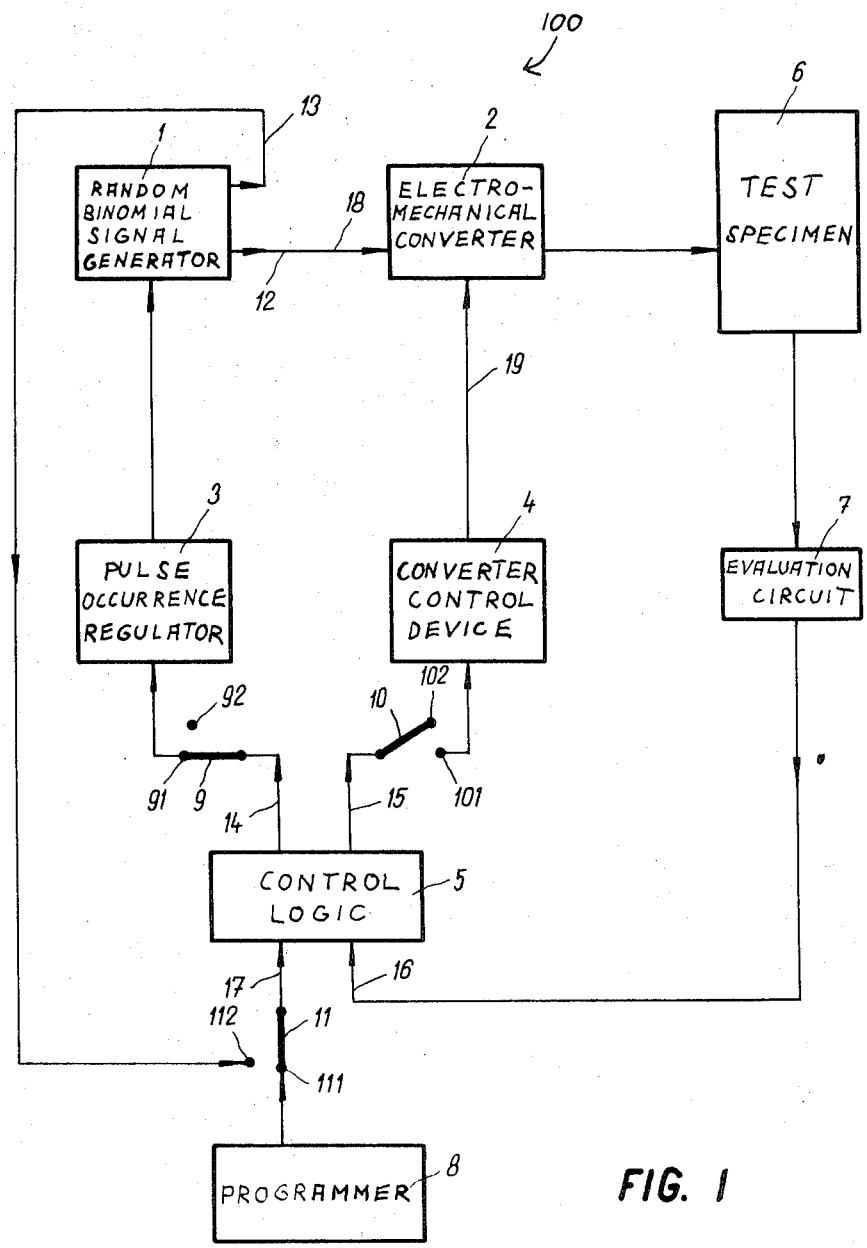
FIG. 1 is a block diagram of a random stress load generator having a variable binomial output density in accordance with the invention, the generator being controllable over prescribed test intervals by a suitable programming device.
Figure 2:
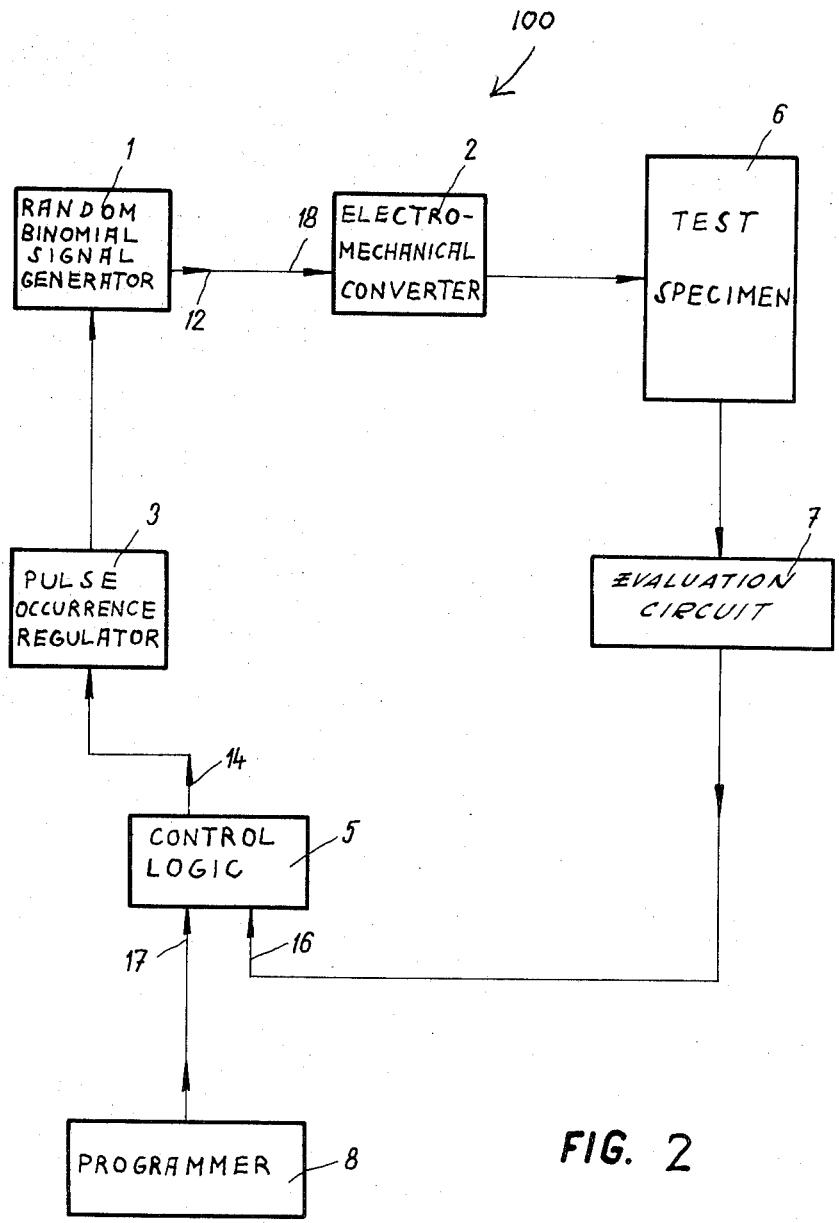
FIG. 2 is a simplified block diagram of the arrangement of FIG. 1.

Referring now in more detail to the drawing, FIGS. 1—2 represent a testing apparatus 100 for applying a random stress load distribution to a test specimen 6 for determining its fatigue characteristics or the like. The specimen 6, which illustratively may be a structural member whose actual loads are to be simulated by the apparatus 100, is assumed to be mounted to receive tension or compression loads in the general manner described e.g., in U.S. Pat. No. 3,304,768 issued to E. C. Naumann and E. L. Bryant on Feb. 21, 1967 and entitled Fatigue Testing Device. The required compression and tension loads may be applied by an electromechanical converter 2, which may include a hydraulically driven ram coupled to the specimen 6 to produce corresponding strains therein. As described in the patent, the converter 2 may be so constructed that fluid is supplied to the ram by a suitable pump through a servovalve. The amount of fluid flow from the pump through the servovalve to the ram controls the stress load amplitude applied to the specimen 6. The amount of fluid flow, in turn, is controlled by the magnitude of control signals applied to the valve from a random signal generator 1, whose output amplitude follows a binominal probability distribution as described below. A suitable load strain evaluation circuit 7, which may be a strain-conventional gage bridge, is coupled to the specimen 6 for producing an electrical voltage proportional to the instantaneous load applied to the specimen by the ram of the converter 2. The bridge output voltage distribution is representative of the distribution of load amplitudes during successive loading cycles and may be fed to an oscilloscope for displaying visually the distribution of the random strain loads on the specimen.

The output of the evaluation circuit 7 is applied to a first input 16 of control logic 5. The output of the programmer 8, which establishes suitable test load sequences for the apparatus 109, is applied to a second input 17 of the control logic 5 through a first contact 111 of a switch 11. The logic 5 compares the desired load distribution established by the program with the actual load strain distribution of the specimen 6 as measured by the evaluation circuit 7 and, in the case of substantial noncoincidence between the actual and desired distributions, the control logic 5 adjusts the binominal random output distribution of the generator 1 in small increments by applying an actuating signal to a triggerable pulse occurrence regulator 3 (which itself may operate in random fashion) through a contact 91 of switch 9. The regulator 3, when triggered, supplies suitable command signals to the generator 1 for this purpose. The resulting change in the binominal distribution of output signal amplitude from the generator 1 varies the amount of fluid flow through the servovalve in the converter 2. This change in fluid flow varies, in a corresponding manner, the loading pattern of the specimen 6 by the ram associated with the converter 2.

The generator 1 produces a random sequence of pulses each having a period T (hereafter designated one "time slot"). The probability of occurrence, designated $A$, of a pulse in any particular time slot of the sequence is governed by the output of the regulator 3.

The probability $P(K)$ of realizing $K$ pulse occurrences in any given succession of N time slots of the random pulse from the sequence generator 1 is defined by a binomial distribution governed by the equation $$P(K) = \frac{N!}{K!(N-K)!} A^K Q^{N-K} \quad (1)$$

The characteristics of such a binomial distribution are set forth in more detail on pages 58—65 of the book System Engineering by H. H. Goode and R. E. Machol, published by McGraw-Hill in 1957. The factor $Q$, which is the probability of nonoccurrence of a pulse in a particular time slot, is equal to $(1-A)$.

It is well known that such a binomial distribution may be modified by changing either the pulse occurrence probability $A$ or the number of time slots $N$ in a test sequence. For example, if $N$ is fixed by the programmer 8, the probability density $P(K)$ can be flexibly varied over wide limits by triggering the regulator 3 to change the pulse occurrence probability $A$. Alternatively, the regulator 3 may be replaced by suitable circuitry (not shown) for varying the length of a time slot $T$. The resulting change in the pulse repetition frequency will provide a fewer or greater number of time slots over any given test interval, thereby altering the factor $N$. For example, FIG. 51 on page 59 in Goode and Machol's book shows the marked change in the shape of the binomial density $P(K)$ as a result of changing $N$ from 5 to 6 while keeping $A$ constant at .33.

The generator 1 is further arranged to convert the random pulse patterns occurring during successive sequences of time slots into correspondingly random control signals representative of the load amplitudes to be applied successively to the specimen 6. In particular, the random pulse pattern in each test sequence of $N$ time slots may be converted into a corresponding number of parallel binary bits of information having a pattern corresponding to the pulse pattern. In a manner analogous to that described in the above-mentioned patent to Naumann et al. such a parallel bit pattern may be applied to suitable registers for providing outputs on a unique one of a plurality of output conductors. Each conductor controls separate one of a corresponding group of potentiometers whose sliders are adjustable so that each potentiometer produces an output different from all other potentiometers. As a result, electrical control signals proportional to the levels set by the successive potentiometers operated by the pulse patterns which are established during successive sequences of time slots in the generator 1 may be applied in analog form over a line 18 to form the required control signals for the servovalve in the converter 2.

Figure 3:
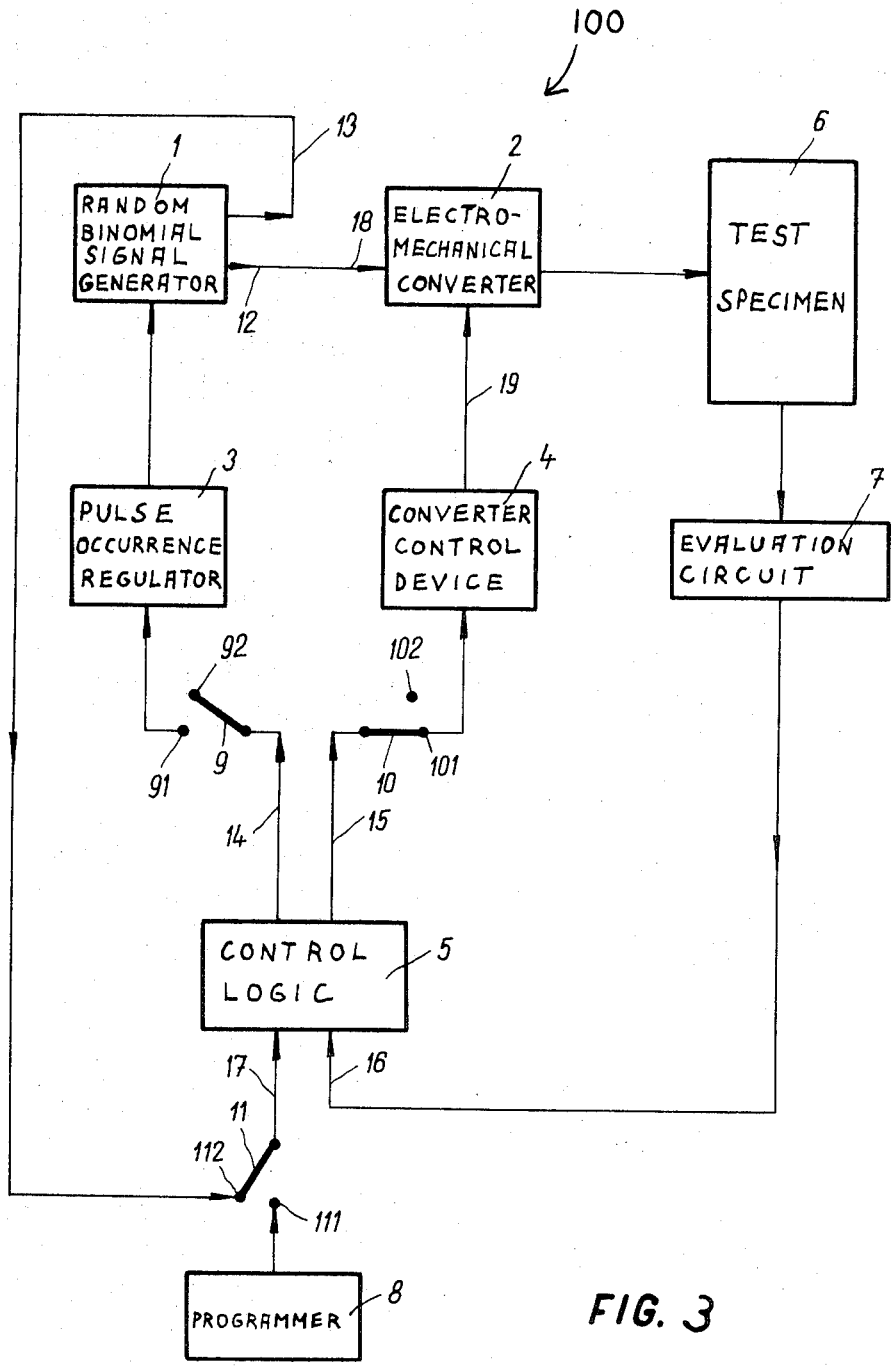
FIG. 3 is a block diagram of a random stress load generator similar to FIG. 1 but employing an electromechanical converter having a variable transfer characteristic, the generator being controllable over random test load intervals defined by a binomial probability distribution.
Figure 4:
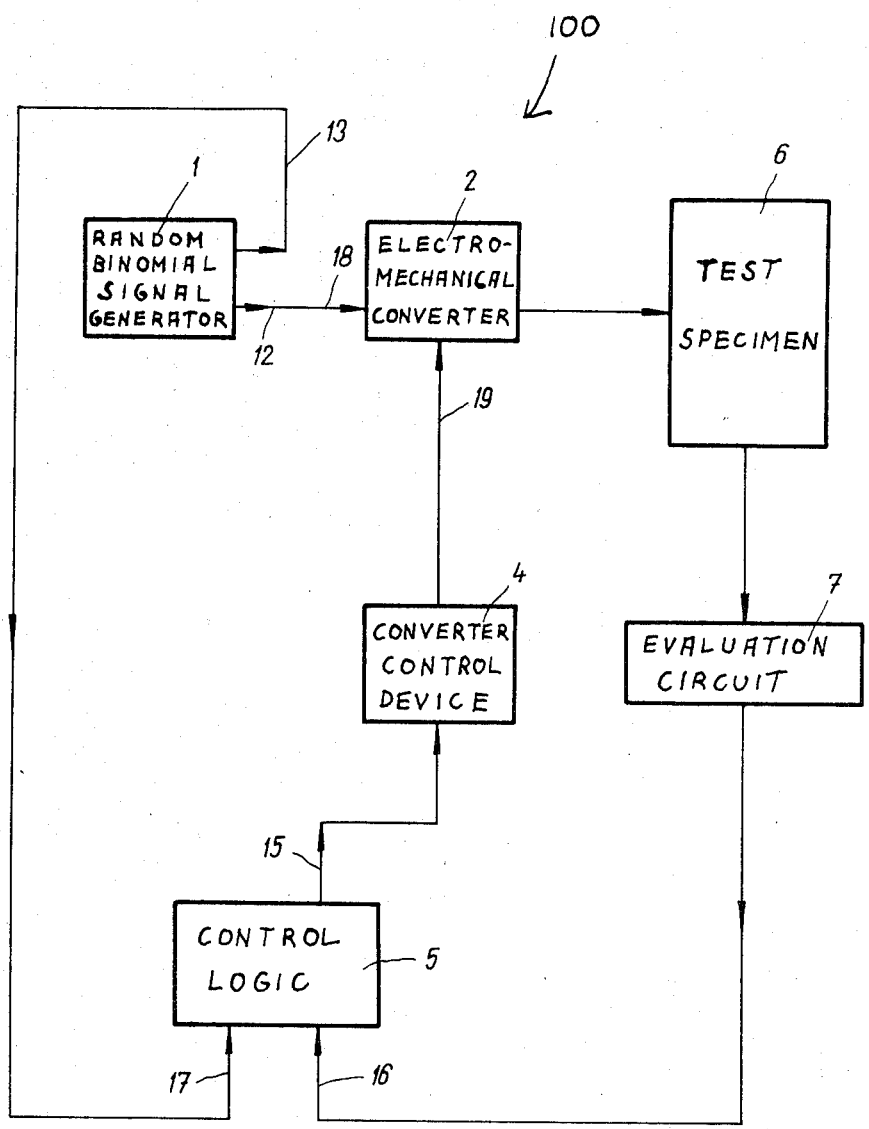
FIG. 4 is a simplified block diagram of the arrangement of FIG. 3.
Figure 5:
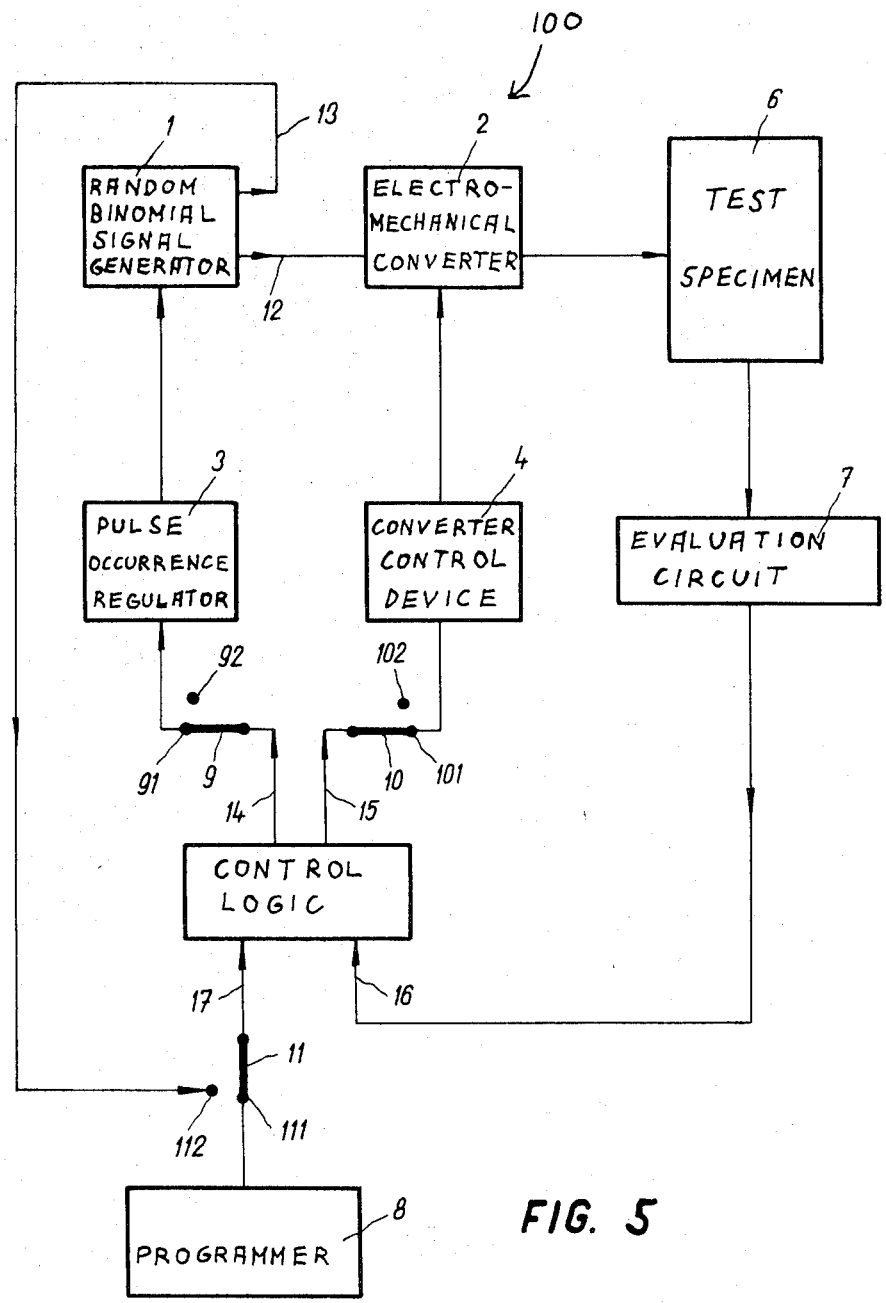
FIG. 5 is a block diagram of a random stress load generator exhibiting a variable probability density characteristic and employing an electromechanical converter having a variable transfer characteristic.

The arrangement of FIGS. 1—2 is primarily adapted to apply random stress loads to the test specimen 6 to fatigue the specimen to failure, and is therefore suitable orimarily for measurements at frequencies removed from the resonant frequency of the specimen at its lowest mode of vibration. For measurements at the natural frequency of vibration, FIGS. 3—4 illustrate a modification of the arrangement of FIGS. 1 and 2 for applying to the specimen 6 a load distribution having a fixed binominal probability density (i.e. with $A$ and $N$ fixed in equation 1). Corresponding elements in FIGS. 1—2 and 3—4 have been given corresponding reference numerals.

The arrangement of FIG. 3 and its operation are that of FIG. 1 except that the switches 9 and 11 are adjusted so that (1) the random binominal pulse sequence produced by generator 1 is applied, from an output 13 thereof, to the input 17 of the control logic 5 in place of the programmer 8 of FIG. 1; and (2) trigger signals at the output of the control logic 5 are decoupled from the pulse occurrence regulator 3 so that the probability density at the output of the generator 1 stays constant irrespective of the actual load distribution measured by the evaluation circuit 7. The output of the logic 5 is instead coupled to a triggerable converter control device 4 through contact 101 of a switch 10. The converter control device 4 is arranged to supply command signals to vary the transfer characteristic of the converter 2, as by altering the factor of proportionality between the amplitude of the control signal at the converter input and the mechanical stress load amplitude which it applies to the specimen 6. The random binominal pulse sequences applied to the input 17 of the control logic 5 from the generator 1 establishes corresponding random sequences of trigger pulses to be applied to the circuit 4. The resulting transfer characteristic of the converter 2 is thereby also altered in a random manner.

In order to provide additional flexibility in varying the transfer characteristics of the converter 2, the device 4 may be provided with facilities for generating output command signals whose probability density defines a random multinominal distribution having the characteristic described e.g., at pages 67—68 of the above-mentioned book by Goode and Machol.

In such a case the probability of signal occurrence in the device 4, and/or their repetition rate, may be chosen in either a random or a nonrandom manner.

Figure 6:
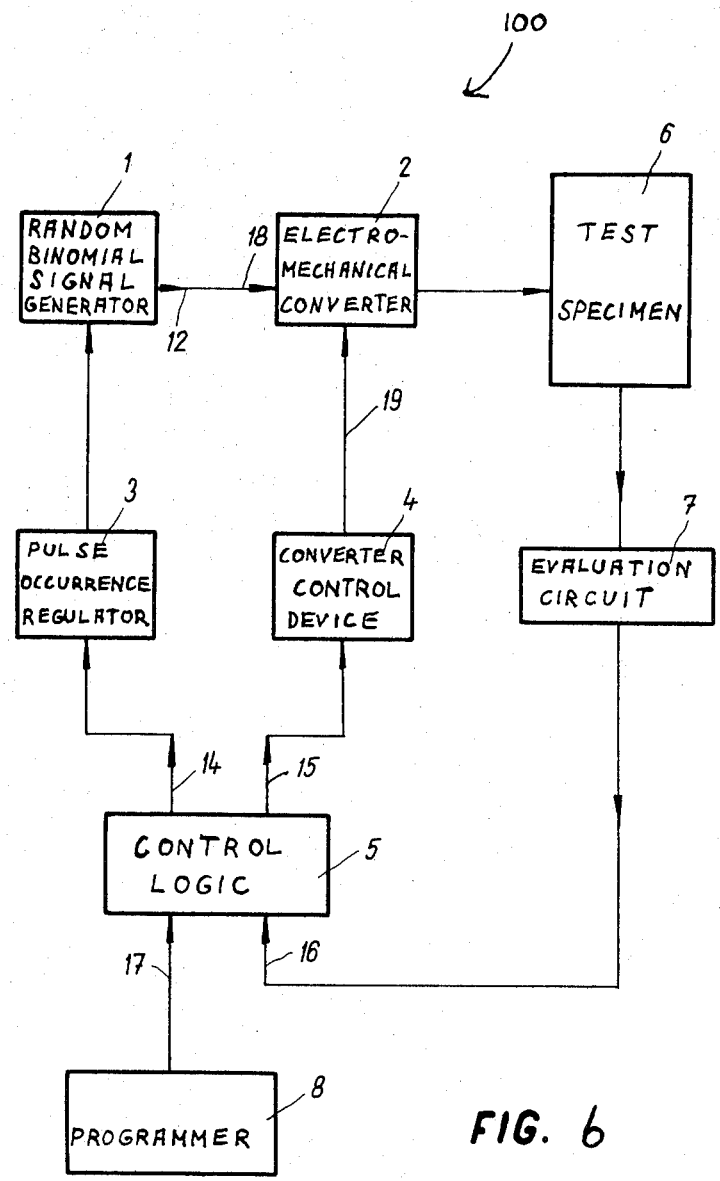
FIG. 6 is a simplified block diagram of the arrangement of FIG. 5.

FIGS. 6—7 illustrate an additional modification of the arrangement FIGS. 1—2 for randomly varying, during test periods established by the programmer 8, both the probability density at the output of the generator 1 and the transfer characteristic of the converter 2. In particular, trigger pulse outputs from the control logic 5 (FIG. 6) are applied simultaneously to the pulse occurrence regulator 3 and the converter control device 4. By analogy to FIGS. 3—4, the arrangement of FIG. 6 may be afforded additional flexibility if the command output signals from the units 3 and 4 have multinomial probability densities. The operation of FIGS. 6 and 7 is analogous to that of FIG. 1—2 and 3—4.

What we claim:

1. Apparatus for generating random mechanical loads for application to a test specimen, which comprises:
   first means for producing random sequences of pulses that occupy one time slot each and that define pulse patterns having a probability density in the form of a binomial distribution over a given sequence of time slots, the probability density of the binomial distribution being parametrically adjustable over successive sequences of time slots;
   second means responsive to the pulse patterns occurring during successive sequences of the time slots for producing corresponding control signals representative of load amplitudes to be applied successively to the specimen; and
   electromechanical conversion means coupled to the specimen and responsive to the occurrence of each control signal for imparting to the specimen a load having an amplitude determined by the then-occurring signal.

2. Apparatus as defined in claim 1, further comprising triggerable first means for adjusting the probability of occurrence of a pulse in a time slot of the first producing means.

3. Apparatus as defined in claim 1, further comprising triggerable second means for adjusting the length of a time slot in the first producing means.

4. Apparatus as defined in claim 1, further comprising triggerable third means for adjusting the transfer characteristic of the conversion means.

5. Apparatus as defined in claim 4, further comprising switching means for selectively triggering the first and third adjusting means.

6. Apparatus for generating random mechanical loads for application to a test specimen, which comprises:
   first means for producing a random sequence of pulses that occupy one time slot each and that define pulse patterns having a probability density in the form of a binomial distribution over a given sequence of time slots, the probability of occurrence of a pulse in a time slot being externally selectable;
   second means responsive to the pulse patterns occurring during successive sequences of the time slots for producing corresponding control signals representative of the load amplitudes to be applied successively to the specimen;
   electromechanical conversion means coupled to the specimen and responsive to the occurrence of each control signal for imparting to the specimen a load having an amplitude determined by the then-occurring control signal;
   triggerable means connected to the first producing means for adjusting the probability of occurrence of a pulse in a time slot to vary the binomial probability density at the output of the first producing means;
   means for measuring the actual strain load amplitude distribution of the specimen in response to the impartation thereto of loads from the conversion means; and
   means rendered effective upon a substantial noncoincidence between the measured strain load amplitude distribution and a desired strain load amplitude distribution for triggering the adjusting means.